United States Patent [19]

Lipp

[11]  4,226,565

[45]  Oct. 7, 1980

[54] ENSILAGE STORING APPARATUS

[76] Inventor: Xaver Lipp, Hohenstaufenstrasse 30, D 7090 Ellwangen, Fed. Rep. of Germany

[21] Appl. No.: 961,276

[22] Filed: Nov. 16, 1978

[30] Foreign Application Priority Data

Nov. 30, 1978 [DE] Fed. Rep. of Germany ....... 2753288
Sep. 1, 1978 [DE] Fed. Rep. of Germany ....... 2838149

[51] Int. Cl.³ .............................................. A01F 25/00
[52] U.S. Cl. .................................... 414/467; 100/66; 100/210; 414/501
[58] Field of Search ............... 414/467, 469, 487, 491, 414/501; 100/65–68, 210

[56] References Cited

U.S. PATENT DOCUMENTS

| 1,109,443 | 9/1914 | McLaughlin | 100/67 |
| 1,255,752 | 2/1918 | Hurrelbrink | 100/67 |
| 3,720,052 | 3/1973 | Anderson et al. | 100/210 X |

Primary Examiner—Stephen G. Kunin
Assistant Examiner—Terrance L. Siemens
Attorney, Agent, or Firm—Roylance, Abrams, Berdo & Farley

[57] ABSTRACT

A system for storage of green fodder and the like includes a cylindrical storage tank removably carried on a trailer which can be towed by a tractor. The frame of the trailer carries a tiltable platform having a rotatable plate on which the tank rests. The frame also carries a vertically movable apparatus for supporting either compaction rollers insertable into the tank top for compressing fodder as it is conveyed into the tank, or an elevator mechanism for lifting the tank away from its bottom cover to expose compacted fodder for removal. The tank is rotated during loading/compaction and removal. Compression of the fodder greatly increases the amount of fodder storable in each tank. After filling the platform is tilted, the tank is removed and can be rolled to a storage location with its axis horizontal.

12 Claims, 9 Drawing Figures

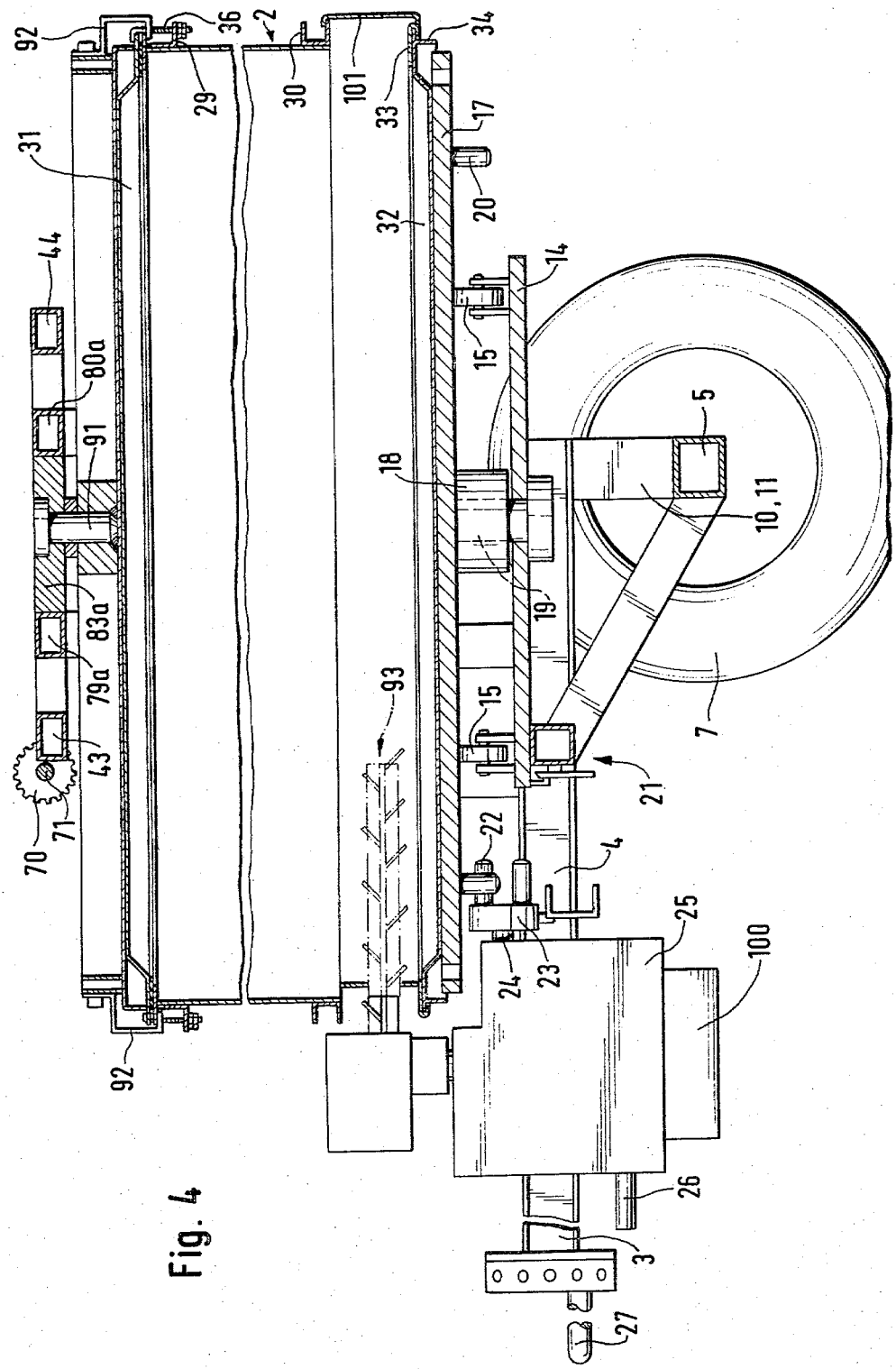

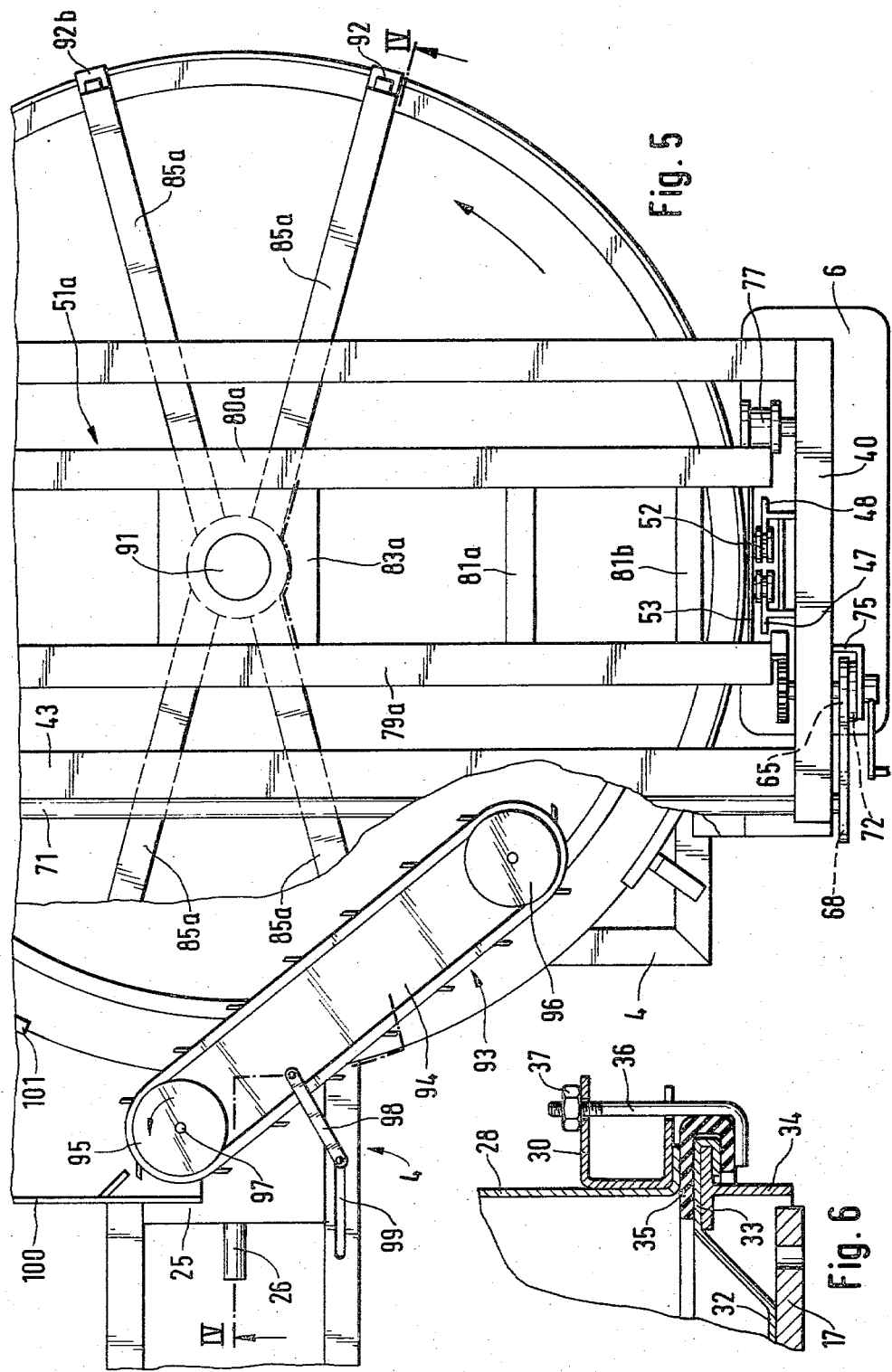

ENSILAGE STORING APPARATUS

TECHNICAL FIELD

This invention relates to a method and apparatus for loading and storing ensilage, for transporting the stored ensilage, and for subsequently unloading the ensilage for use.

BACKGROUND ART

It is customary when storing silage such as green fodder and the like to use a storage facility which is fixed in one location to which the fodder is transported. Commonly, the fodder is delivered to a stationary silo and is conveyed or blown into the storage silo. Thereafter, when the time arrives for use of the silage, the storage chamber is emptied either from above or below and the fodder is moved by a conveying apparatus from the storage facility to the feeding location. It is very expensive to move the fodder from its place of production into the storage silo. Also, the filling of the silo commonly takes quite some time and it is also common for extended pauses to occur in the course of the filling during which the uppermost layer in the storage may become unusable so that some portions of the filled silo cannot be used for animal feed. The removal of the silage from the storage chamber also involves considerable expenditure of time and expense in conveying apparatus.

It is known to provide a movable fodder container into which the fodder is filled loosely and wherein the fodder is preserved in loose bulk. This necessitates a large number of containers for the accommodation of a sufficient supply of fodder and also a large storage space for the transportable fodder containers which have been filled. An apparatus of this type is shown in German Offenlegungsschrift No. 19 31 786.

DISCLOSURE OF INVENTION

An object of the present invention is to provide a method and apparatus for filling a storage container at the fodder producing location in such a way that the fodder occupies the least possible space.

Briefly described, the invention includes an improved process for storing and transporting silage, green fodder and the like in a storage tank movable on and removable from a vehicle, the tank having a removable cover on at least one end thereof and wherein the fodder is loaded into the tank from above and the loaded tank is hermetically sealable and is removable from the vehicle for separate storage, comprising the step of compressing the fodder to approximately one-half its loose volume as it is loaded into the tank whereby the volume of the storable fodder is decreased.

The invention also includes the step of subsequently removing the compacted fodder for use by lifting the tank so that the side wall separates from the bottom wall while the bottom wall continues to support the compacted fodder mass, and inserting a removing device into the space between the separated side and bottom walls and pulling fodder from the lower exposed portion of the compacted mass.

The invention further contemplates an apparatus for storing and transporting fodder and the like comprising a storage tank having a side wall, a top wall and a separable bottom wall and wherein the top wall is openable to permit filling of the tank with fodder, a vehicle having a frame, and means on the vehicle frame for releasably supporting the tank for filling and transporting, the means including tiltable support means for tilting the tank about a horizontal tilting axis, means including a drive mechanism for rotating the tank about a vertical axis, pressure roller means insertable into the upper end of the tank for compacting fodder therein as the tank is being filled, vertically movable means for releasably supporting the pressure roller means and for elevating the pressure roller means as the tank is filled with fodder compacted thereby, the pressure roller means being removable from the tank and from the vertically movable means after filling of the tank.

Using the method and apparatus disclosed herein, the storage tank can be filled in a simple manner from above during which filling it is rotated about its vertical central axis to facilitate uniform filling. The pressure roller apparatus serves for compacting the fodder as it is loaded into the tank. The lift apparatus carrying the pressure roller is constructed so that the pressure roller can be removed and a support engaging with the storage tank can be attached for emptying the tank. A simple removal of the storage tank from the vehicle carrying it and simple attachment of the storage tank of the vehicle is achieved by means of the tiltable supporting arrangement for the tank.

By means of a frontal projection on the cover, a positive connection is provided between the cover and the supporting arrangement so that the storage tank cannot slip off. A simple connection of the storage wall with the cover or covers and hermetic sealing thereof is also provided.

The tank is also provided with means to render the tank simple to handle after it has been removed from the vehicle. The tank includes rails surrounding the storage wall developed in the manner of a wheel rim so that the storage tank can be moved simply by rolling it with its central axis in a horizontal location, with or without the use of towing vehicle. Preferably, the two rails surrounding the cylindrical storage wall are spaced apart longitudinally with respect to the axis of the tank and are developed as wheel rims so that the storage tank can be supported at two points without there being any need for the wall of the tank itself to rest on the ground. Also, with the tank in its horizontal position, a cover can be removed to empty the material therein from the top side, if desired.

Draft apparatus for pulling the tank, in its rolling position using a motor vehicle, is also provided.

BRIEF DESCRIPTION OF DRAWINGS

In order that the manner in which the foregoing and other objects are attained in accordance with the invention can be understood in detail, particularly advantageous embodiments thereof will be described with reference to the accompanying drawings, which form a part of this specification, and wherein:

FIG. 4 is a side elevation, in partial section, along line IV—IV of FIG. 5 in condition for unloading;

FIG. 5 is a top plan view of the apparatus of FIG. 4;

FIG. 6 is an enlarged partial side elevation along line VI—VI of FIG. 3;

Figure 1:
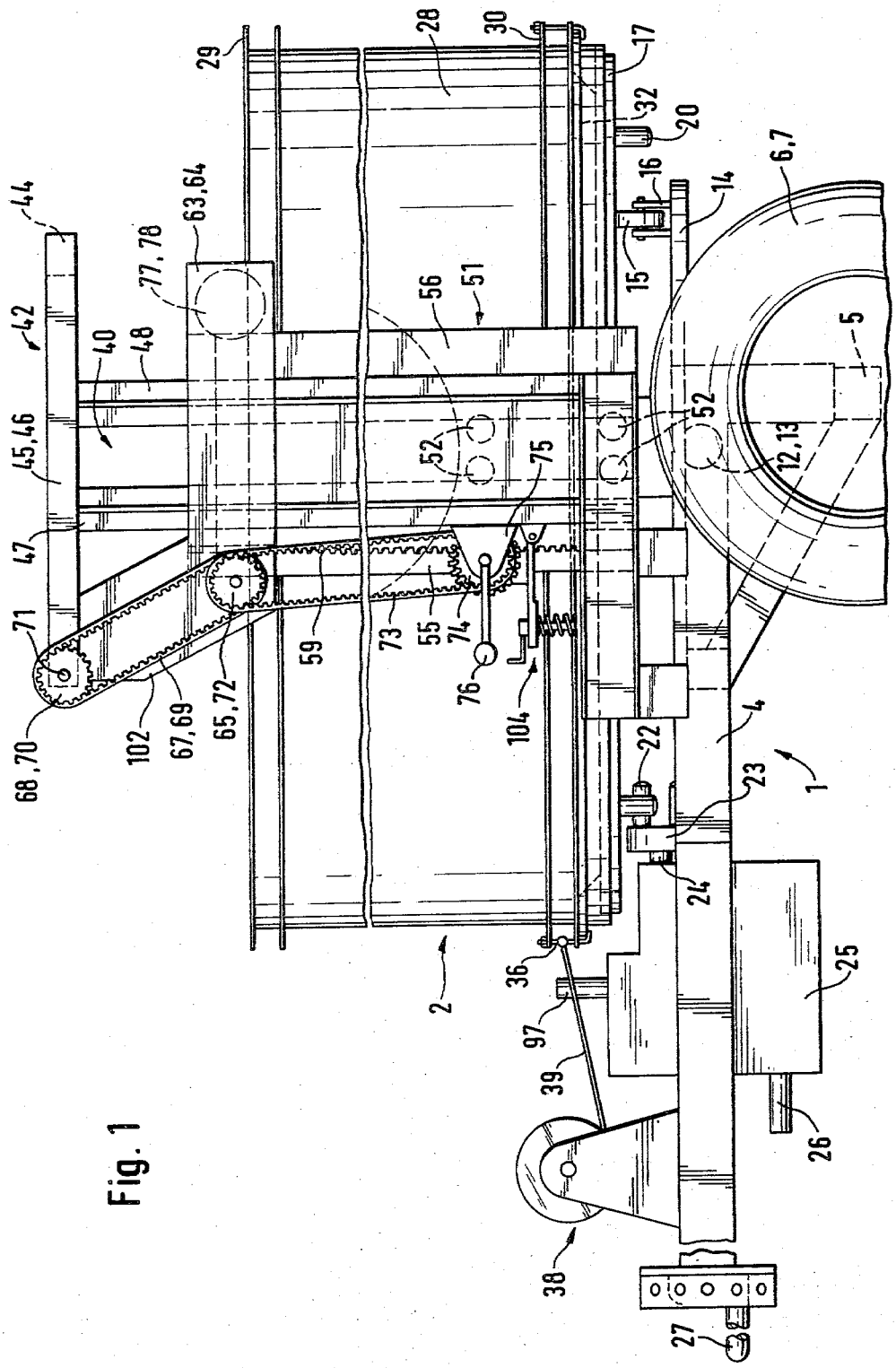
FIG. 1 is a side elevation of a portable fodder storage tank and transporting vehicle in accordance with the present invention.
Figure 2:
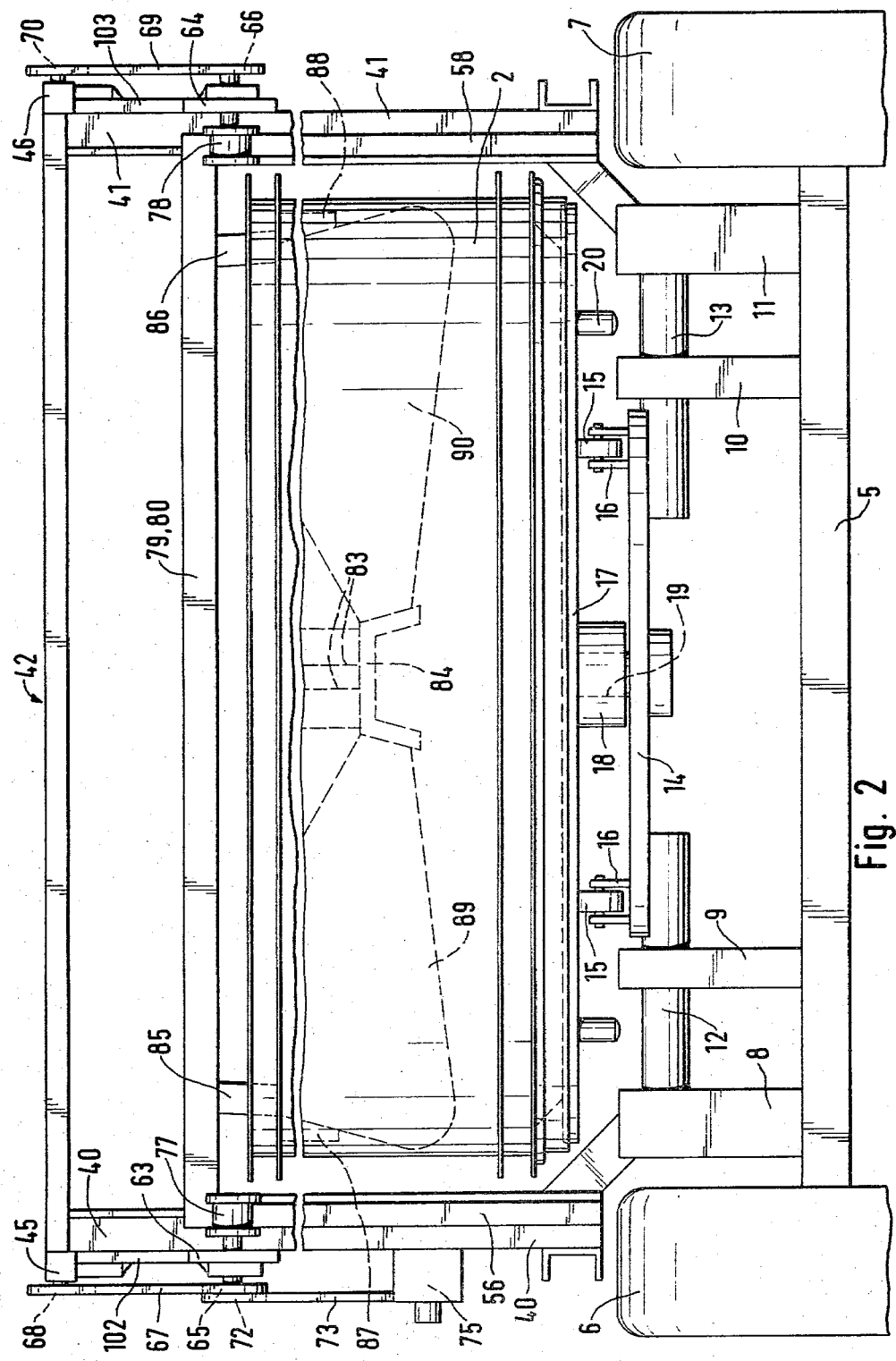
FIG. 2 is a rear end elevation of the apparatus of FIG. 1.

Referring now to the drawings in detail, as shown in FIG. 1, there is provided a two-wheeled vehicle indicated generally at 1 which receives and carries a storage tank indicated generally at 2, the vertical dimension of the tank being foreshortened. The overall width of the vehicle is selected so that it can travel on a road as a trailer of a tractor-type vehicle, the width being, for example, in the order of 2.5 meters. The height of the entire vehicle 1, with a storage tank 2 mounted thereon, is selected so that the vehicle can be driven into a stable building and can amount to, for example, approximately 2.6 meters. The vehicle has a frame 4 firmly connected to a trailer pole with an axle 5 fixedly attached to the frame and disposed below it. At the ends of the axle are provided wheels 6 and 7. On the continuous transverse axle 5, vertically extending bearing supports 8–11 are attached. On the left side of the structure, as shown in FIG. 2, a shaft 12 is mounted on bearing supports 8 and 9 and, on the right, a shaft 13, coaxial with shaft 12, is carried by supports 10 and 11. The shafts 12 and 13 carry a tilting platform 14 which lies between bearing supports 9 and 10. On platform 14 are bearing clevises 16 which have support rollers 15. A plurality of support rollers 15 are circularly disposed on the platform, at the same radius, and these carry a bearing plate 17 which serves for the raising of the storage tank 2. Bearing plate 17, which is rotatable about its central vertical axis, carries in its center a bearing bushing 18 which receives a bearing peg 19 attached to the tilting platform 14, the axes of the bearing bushing 18 and of the bearing peg 19 are perpendicular to bearing plate 17 and tilting platform 14. The bearing bushing 18 and the bearing peg 19 prevent lateral shifting of the bearing plate 17 with respect to platform 14. Platform 14 can be tilted about the common axis of shafts 12 and 13, and the arrangement of the tilting axis is established so that the center of gravity of the tiltable portions of the vehicle, together with the silage container, constantly exert a slight rearward tilting moment. In order to prevent tilting of the platform 14 with respect to frame 4 of vehicle 1, a manually operable latch device 21, is provided as shown in FIG. 4.

Bearing plate 17 carries at its underside a circular array of driving pins 20 only a few of which are shown. Pins 20 mesh with horizontally disposed driving pins 22 of a driving gear 23 which is mounted on the drive shaft 24 of a gear mechanism 25, mechanism 25 having a power takeoff shaft connection 26 which is connectable to a tractor, not shown. The trailer pull 3 has a suspension eye 27 which is adjustable in its height.

Storage tank 2, located on bearing plate 17, is a hollow cylindrical body having a wall 28, the ends of which are bent into a flange protruding radially outwardly, the wall being surround by U-shaped circular rails 29 and 30, the U-shaped cross section of each being arranged so that the legs protrude toward the outside. Storage tank 2 is provided with covers 31 and 32 at its upper and lower open ends, respectively. The two covers are formed as flat plates and are provided with flange-like edges 33, the outer diameters of which correspond approximately to the outer diameters of rails 29 and 30. On the inner portion of each cover is a T-strip 34 embraced by the edge of the cover and fitting with its transverse head against the edge, as best seen in FIG. 6. The portion of the T-strip 34 which projects vertically from edge 33 is longer than the vertical depth of the cover 31 or 32 with which it is associated, and surrounds bearing plate 17 with a slight annular gap existing between the strip and the plate, forming a stop to prevent movement of the tank parallel with the plate, also as seen in FIG. 6. Between the edge 33 and the portion of wall 28 embracing rail 30, there is provided a sealing ring 35 formed from an elastomeric material, such as rubber, which surrounds edge 33 and also the transverse outer side of T-strip 34. Screw hooks 36, which extend through and are secured to the U-rails by fastening nuts 37, extend underneath the T-strip 34, or above the respective upper cover, to attach the lids 31 or 32 to the wall securely.

A winch 38, which can alternatively be driven by motor or manually, is mounted on trailer pole 3, the rope or cable from which can be connected to a screw hook 36 attached on the storage tank 2 at a point closest to winch 38. By using winch 38, and with latch device 21 released, the tilting platform 14 and the portions of the vehicle connected with it including storage tank 2 can be permitted to tilt slowly rearwardly under the action of the weight of these components until the storage tank 2 rests on the ground, or other supporting surface on which the trailer stands, whereupon the tank can be removed from the vehicle in a simple manner. During this process, winch 38 is unreeled, permitting controlled tilting of the platform and tank structure. With the apparatus tilted so that the central axis of the storage tank is horizontal, or nearly so, the tank can be removed and replaced with a new storage tank which can then be moved into the position shown in FIG. 1, using winch 38 to overcome the force of gravity which accomplished the tilting operation. On the sides of frame 4, horizontal U-shaped frames are attached to which vertical rails 40 and 41 are attached. Rails 40 and 41 are interconnected by a transverse head indicated generally at 42 which is formed as a rectangular frame having two transverse bars 43 and 44 supported in substantially parallel spaced relationship, these bars being interconnected at the ends by longitudinal members 45 and 46 which lie on opposite sides of the vehicle. The longitudinal member 45 is attached to rail 40 and member 46 is attached to rail 41. The transverse bar 44 can be removed to permit lifting of the storage tank 2 off the vehicle by means of a conventional three-point suspension.

Figure 3:
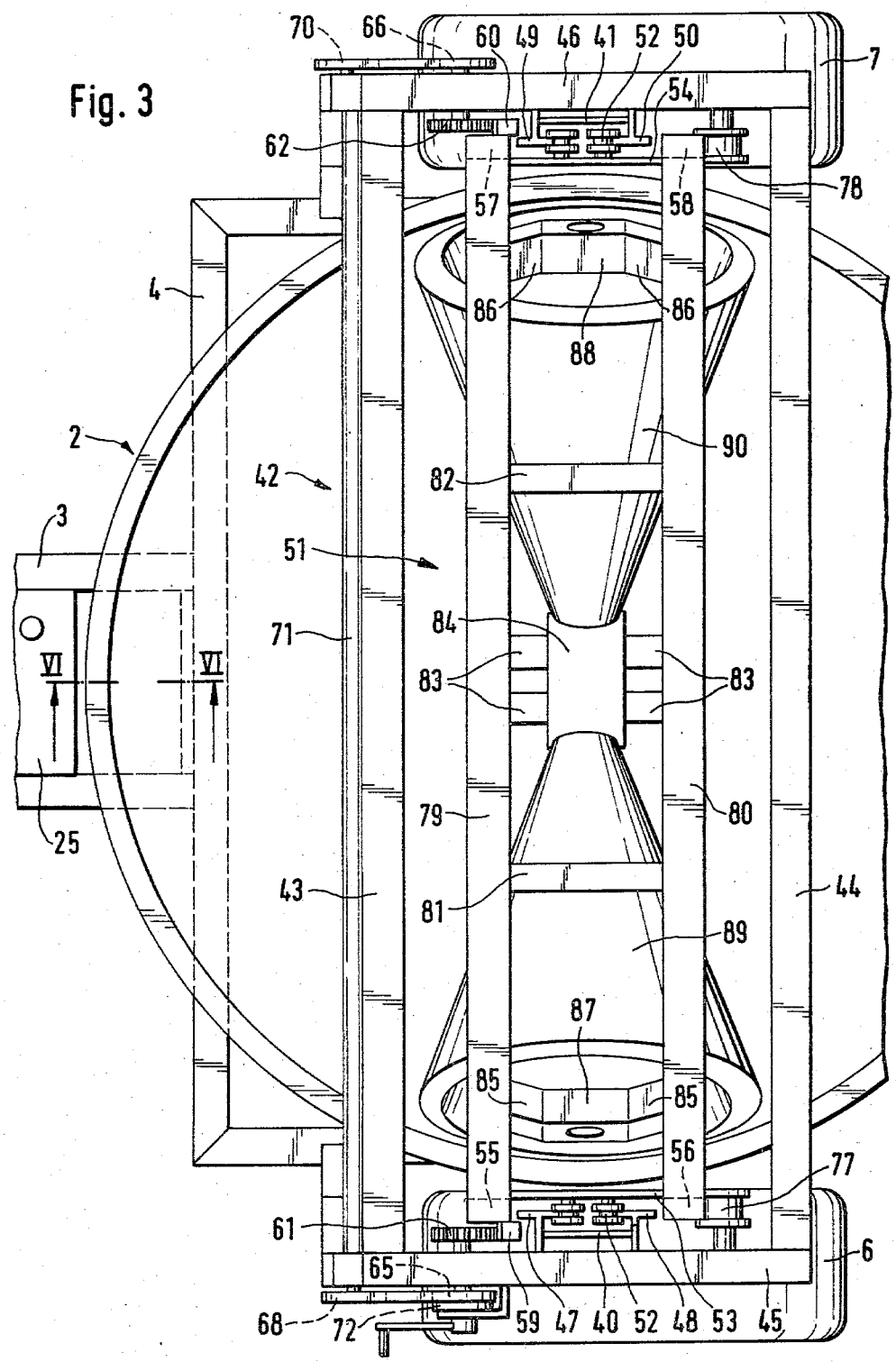
FIG. 3 is a partial top plan view of the apparatus of FIGS. 1 and 2.

Rails 40 and 41 are each formed from two T-shaped members, rail 40 being formed using T-shaped members 47 and 48 and rail 41 being formed from members 49 and 50, the T-shaped members being interconnected by a plate which lies in a plane parallel with the direction of travel of the vehicle, the plate being connected to the T-shaped members so that their crossheads lie in a single plane. The protruding legs of members 47, 48, 49 and 50 of rails 40 and 41, which protrude outwardly and therefore face away from each other, permit the inner legs of the crossheads to serve as running tracks for a lift truck indicated generally at 51 (FIG. 3) which is vertically movable and which is provided at each end with two pairs of lifting guide rollers 52, each roller having annular traveling grooves, the pairs of rollers being disposed vertically relative to each other. Thus, at each end of the structure, four rollers 52 are rotatably mounted on a carrying plate, plate 53 being associated with rail 40 and plate 54 being associated with rail 41, the plates being substantially parallel with the interconnecting plates of the rails 40 and 41. At the edges of carrying plates 53 and 54, which are shown in the drawings as being vertical, members 55, 56, 57 and 58 of the frame are attached. Frame part 55 carries a toothed rack 59 and the opposite frame part 57 a toothed rack 60. Rack 59 meshes with a gear 61 and rack 60 meshes with a gear 62. Gear 61 is mounted on a longitudinal carrier 63 by a shaft which penetrates the gear and, on the other end of the shaft, is a gear 65 which is fixedly attached to the shaft. Gear 62, located at the other side of vehicle 1, is rotatably mounted on a shaft in carrier 64, on the other end of which is a gear 66, similarly disposed to the outside and seated torsionally. Gear 65 is torsionally connected by means of a toothed belt 67 with a gear 68, mounted on longitudinally extending rod 45, and gear 66 is connected by means of a toothed belt 69 with a gear 70, mounted on rod 46. The two gears 68 and 70 are torsionally interconnected and move in synchronism by means of a cross shaft 71. In addition to gear 65, a gear 72, connected with gear 65, is mounted and is connected by a toothed belt 73 with a gear 74 which is mounted close to the vehicle frame. Gear 74 is mounted in a bearing bracket 75 attached to rail 40 and is rotatable with a handcrank 76. Crank 76 may be provided with means, not shown in detail, for stopping the crank at any of several rotatable positions so that the lift truck 51 is adjustable in various height positions. A manually operable brake 104 is connected with the shaft of gear 74 to prevent an undesired lowering of lift truck 51. Brake 104 has a brake shoe attached to a lever which can be made to act on a brake wheel rotatably connected with gear 74. The lever is connected to a helical compression spring which urges the brake shoe against the brake wheel, the length of the spring being adjustable by a locally fixed screw bolt which is coaxial to the spring and provided with a manually rotatable nut.

The lift truck 51, on the side facing away from gears 65 and 66, is guided by means of guide rolls 77 and 78 which cooperate respectively with frame members 56 and 58, the rolls being rotatably mounted on the longitudinal carriers 63 and 64.

A crossbar 79 is releasably attached to the two frame parts 55 and 57 and a crossbar 80 is releasably attached to frame parts 56 and 58.

The two crossbars 79 and 80 which are releasably mounted on the lift truck 51 are interconnected by connecting struts 81 and 82. Crossbars 79 and 80 carry a central supporting bearing body 84 on the struts 83 which project downwardly and inwardly tward the center of the silage tank 2. Downwardly and inwardly extending carrying struts 85 and 86 support lateral bearing bodies 87 and 88. A pressure roller 89 is rotatably mounted between bearing bodies 84 and 87, and a pressure roller 90 between bearing bodies 84 and 88. The two pressure rollers 89 and 90 are in the shape of cones, with their lowest surface lines forming an obtuse angle of about 170° with each other, the apex of this angle pointing upwardly. Each of pressure rollers 89 and 90 extend over not quite half the diameter of the storage tank 2 and the outer ends thereof therefore lie deeper than the ends nearest the center. They may be provided with an annular bead at their outside ends and the lowest surface lines of the two rollers are disposed approximately horizontally in the center. The vehicle 1 is coupled to a tractor, not shown, for filling storage tank 2, the tractor being provided with a conveyor mechanism which leads to the upper, open end of storage tank 2. During travel or standstill of vehicle 1, the storage tank can be driven from the power takeoff shaft of the vehicle at a low speed. The fodder fed into the storage tank 2 is compressed by pressure rollers 89 and 90 and lift truck 51, which supports the pressure rollers 89 and 90, is elevated as the level of fodder within tank 2 increases.

Because of the compression of the fodder by the pressure rollers 89 and 90, the space needed for the storage of the storage tank 2 amounts to only about one-third of the space of standard storage equipment to be used for the same quantity of fodder. When the storage tank is filled to the top, it is replaced by another storage tank 2. For this purpose, pressure rollers 89 and 90 are lifted to a level such that storage tank 2, together with the supporting arrangement 14–17, is tilted using the winch 38 as previously described, and the storage tank alone can be removed from the supporting structure. Handcrank 76, the position of which is fixed in the case of lifted pressure rollers 89 and 90, serves for the lifting of the pressure rollers. After an empty storage tank 2, open at the top, has been placed on the bearing plate 17 of the supporting structure, and the supporting structure together with the tank has been tilted back into the operating position using winch 38, lift truck 51 and the pressure rollers mounted thereon are lowered by releasing brake 104. After lowering the pressure rollers 89 and 90, the storage tank 2 is again ready to receive fodder. It is then in the position shown in FIG. 1.

The filled storage tank 2 is hermetically closed by putting on the cover 31, interposing a sealing ring corresponding to sealing ring 35, and fastening the cover by using screw hooks corresponding to the screw hooks 36, whereupon the tank is ready to be moved to its place of storage.

When the contents of the full storage tank are to be fed out of the tank, the vehicle 1 is changed as shown in FIGS. 4 and 5. For this purpose, the crossbars 79 and 80 with components 81–88 and rollers 89 and 90 attached thereto, are removed from the lift truck 51 and crossbars 79a and 80a are attached thereto. These new crossbars carry a bearing 91 mounted on a carrying strut 83a which, as shown in FIGS. 4 and 5, has a vertical axis. Four radially extending carrying struts 85a are attached to the bearing 91 at the ends of which stirrups 92, extending to the bearing 91 at the ends of which stirrups 92, extending beneath upper cover 31, and connected with the storage tank 2, are releasably attached.

The cover 32, seated on bearing plate 17, is released from storage tank 2 which is located on the bearing plate and, by lifting the lift truck 51, the storage wall 28 and the cover 31 located thereon are lifted sufficiently far so that a milling tool indicated generally at 93, formed somewhat in the manner of a chainsaw, can engage the side of the lower portion of the fodder located in the storage tank. The chainsaw 93 has a carrying blade 94 with reversing wheels 95 and 96 rotatably mounted at the ends thereof. Reversing wheel 95 is connected to and rotatable with a drive shaft 97 which perpendicularly projects from gearbox 25. In order to limit the swiveling path to be swept by the blade 94 around the axis of drive shaft 97, the carrying blade 94 can be connected with the frame 4 through a connecting rod 98 articulated thereto so that the end coupled to frame 4 is located in an elongated opening 99. The portion removed from the exposed fodder by milling tool 93 reaches the outside by a slide or chute 100 (FIG. 5) which can be, for example, a feeding trough of a stable. That part of the fodder which is accessible to milling cutter 93 lies exposed while the remaining circumference is encircled by a U-shaped covering rail 101 which, at its upper side, is supported by the lower leg of the U-rail 30 and, on its lower side, by the crossbar of the T-strip 34. The vehicle 1 can be moved during emptying of the storage tank.

When the storage tank 2 has been emptied, then the empty storage tank, after stopping the milling tool 93 and swiveling it out of the way, can be replaced in the previously described manner by a full storage tank 2, the lower part of which is again exposed after releasing the cover 32. Instead of the lift truck 51 with carrying stirrups 92 attached thereto, one can use a lifting device engaged at the lower end of the storing wall in order to lift the storage wall 28. Such a lifting apparatus may have engaging lifting spindles, jacks, or the like, at least three places. When the storage tank 2 is actuated in order to lift its storage wall 28 off the cover 32 lying below it, then only one of the lifting spindles or the like, disposed in a circle, needs to be operated for lifting tank 2 while the remaining spindles merely need to be readjusted. As a rule, a roller having a stop collar, such as a double-cone roller restricted in the middle, which can be arraged with a slanting or vertical axis, serves for the engagement at the lower edge of the storage wall 28, especially at the U-rail 30. The lifting apparatus can be attached either on the frame 4, in which case the traveling capacity of the vehicle 1 is preserved or it can be supported on the ground.

An hydraulic piston and cylinder assembly can be used instead of winch 38. In this case, the swiveling axis is preferably disposed behind the axis of wheels 6 and 7.

In the previously described embodiment, the lift truck 51 is disposed generally in the middle of storage tank 2. It may, however, also be mounted elsewhere, such as in the front of the storage tank and can have an arm directed toward the center of the tank on which pressure rollers 89 and 90 or the carrying stirrups 92 can be attached.

Instead of the power takeoff drive shaft, individual motors, particularly hydraulic motors, can be used. Alternatively, one or more electric motors can also be used for the drive.

Figure 7:
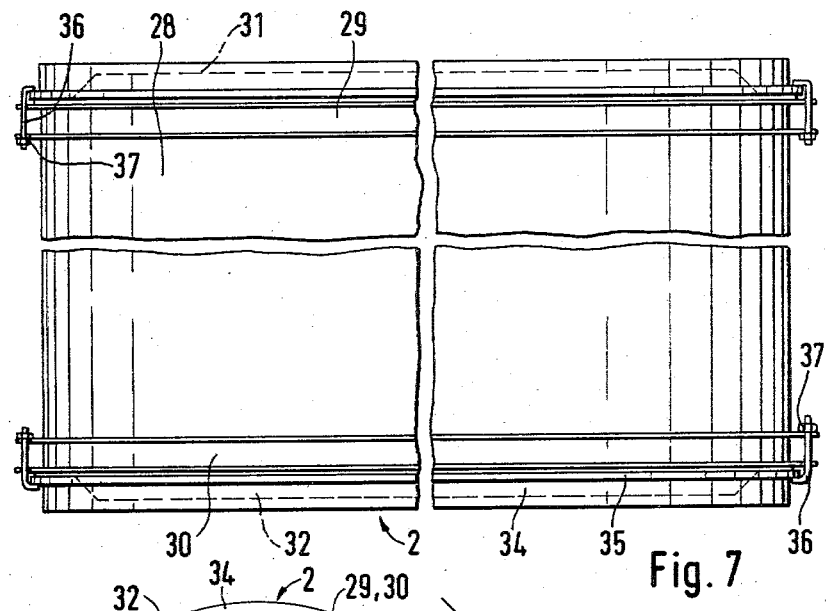
FIG. 7 is a side elevation of the storage tank of the apparatus of FIGS. 1–6 alone.
Figure 8:
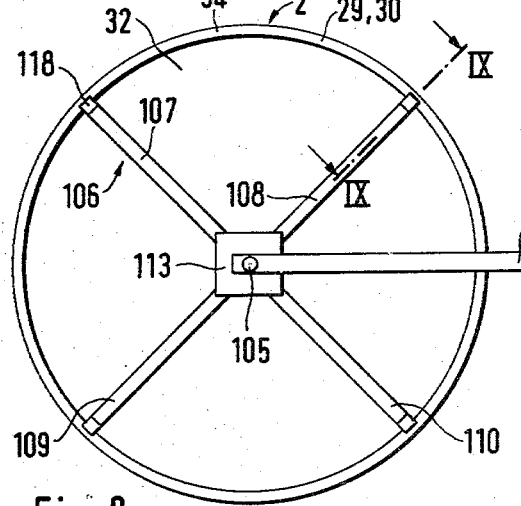
FIG. 8 is a side elevation of a further embodiment of an apparatus in accordance with the invention at a reduced scale.
Figure 9:
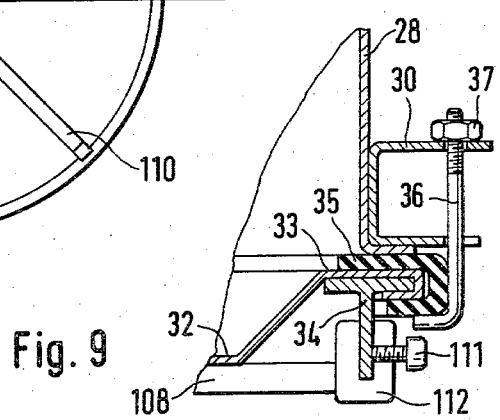
FIG. 9 is an enlarged sectional view along line IX—IX of FIG. 8.

The storage tank 2 shown in FIG. 7 and 8 has a storage wall 28 which is circular in cross section in the manner of a hollow cylinder and has a diameter of about 1.5 meters. The U-rails 29 and 30 encircling this storage wall are formed in a manner similar to wheel rims, longitudinally spaced apart along the axis of the storage tank 2, on which rims the storage tank can be rolled in the manner of a wheel.

The storage container 2, shown in FIGS. 7 and 8, can be rolled by hand with its axis horizontal, riding on the U-rails 29 and 30 which act as wheel rims. However, it is also possible to roll away the storage tank using a motor vehicle. For this purpose, a bearing pin 105 is attached to the storage tank coaxially with its longitudinal axis (FIG. 8). The pin can be fastened to a bearing pin carrier 106 which includes crossbraces 107–110 which extend radially outwardly from the longitudinal axis of the storage tank. These braces, at their outside ends, have clamps 112 provided with clamping screws 111 which can be fastened by attaching them to part of the T-strip 34 disposed in axis parallel relationship to the longitudinal axis of the storage tank, and can be fixed by tightening the clamping screw 111. The braces 107–110 are attached to a connecting plate 113 in the area of the longitudinal axis of the storage tank 2, which plate carries the bearing pin 105. A similar bearing pin carrier can be attached on the opposite side. The bearing pins 105 provided on opposite sides can serve for the mounting of a bifurcated pole 114, the other end of which can be connected to a motor vehicle. The pole thus services as a towing clevis and can subsequently be removed from the bearing pins.

Instead of the bearing pin carrier 106 shown in FIG. 8, bearing pins can be attached directly to the centers of the outside of the covers 31 and 32. It is also possible to attach an apparatus on the outside of the cover for the fastening of a bearing pin such as, for example, welding a plate to the cover which plate carries a threaded sleeve for screwing in of an appropriately formed bearing pin. Other devices for the attachment of a bearing pin coaxially with the longitudinal axis of the storage tank 2 are also possible.

Storage wall 28 can have a cylindrical cross section different from that shown, for example, a polygonal cross section, which would permit rolling away of the storage tank on rails 29 and 30 formed as wheel rims.

The legs of rails 29 and 30 can be formed having equal or unequal lengths. In order to obtain a wide support on the bottom, the distance between the two legs of equal length can be bridged by a belt extending entirely around the container. For the same purpose, it is also possible to dispose the U-rail in the opposite direction so that the longitudinally extending wall thereof lies radially outwardly, in which case at least one of the legs would be beveled for fastening to the storage wall 28. When the radial distance between the storage wall and the outwardly lying bottom wall of the U-rail structure such as 29 and 30 is not sufficiently great, it is then possible, in order to achieve greater spacing between wall 28 and the ground, a broader wheel rim, in the form, for example, of two semi-circles, can be attached to rails 29 and 30 radially outwardly thereof.

U-rails 29 and 30 can also be developed as an inside ring of a roller bearing, the roller body of which is encircled by an outside ring serving for the support of the storage tank 2 on the ground.

While certain advantageous embodiments have been chosen to illustrate the invention, it will be understood by those skilled in the art that various changes and modifications can be made therein without departing from the scope of the invention as defined in the appended claims.

What I claim is:

1. An apparatus for storing and transporting fodder and the like comprising
    a storage tank having a side wall, a top wall and a bottom wall at least one of the walls being separable and wherein the top wall is openable to permit filling of the tank with fodder;
    a vehicle having a frame; and
    means on said vehicle for releasably supporting said tank for filling and transporting, said means including
        tiltable support means for tilting said tank about a horizontal tilting axis;

means including a drive mechanism for rotating said tank about a vertical axis;

pressure roller means insertable into the upper end of said tank for compacting fodder therein as said tank is being filled;

vertically movable means for releasably supporting said pressure roller means and for elevating said pressure roller means as said tank is filled with fodder compacted thereby;

said pressure roller means being removable from said tank and from said vertically movable means after filling of said tank.

2. An apparatus according to claim 1 and further comprising means for facilitating removal of the compacted fodder for use including means mountable on said vertically movable means, in place of said pressure roller means, for engaging and lifting said side wall away from said bottom wall to expose the lower portion of the compacted fodder for removal thereof.

3. An apparatus according to claim 2 and further comprising unloading means coupled to said drive mechanism for engaging the exposed lower portion of the compacted fodder for removing said fodder.

4. An apparatus according to claim 2 wherein said side wall is a cylindrical wall having open ends and said top and bottom walls each include means for connection thereof to said ends in hermetic sealing relationship, and wherein each of said top and bottom walls includes at least one axial projection extending away from said side wall.

5. An apparatus according to claim 4 wherein each end of said side wall is surrounded by a rail member, and wherein each of said top and bottom walls includes a packing ring between said rail and said axial projection, and each of said means for connection includes a plurality of releasable attachment means for coupling one of said rails to the adjacent projection.

6. An apparatus according to claim 4 wherein said tiltable support means includes a platform supported for rotation about a horizontal axis; and said means for rotating includes a plurality of bearing rollers on said platform, a bearing plate supported and rotatable on said bearing rollers for supporting said tank, a central bearing peg attached to said bearing plate and journaled in said platform, and means for coupling said bearing plate to said drive mechanism;

said at least one axial projection on said bottom wall of said tank extending into the plane containing said bearing plate when said tank is on said bearing plate to the front and rear of said plate in the direction of movement of said vehicle to form stop members.

7. An apparatus according to claim 1 wherein said vertically movable means includes substantially vertical guide rails extending upwardly from opposite sides of said vehicle frame;

at least one toothed rack mounted on said vehicle frame and extending parallel to said rails;

transverse support members;

a plurality of guide rollers movable along said guide rails;

means for mounting said transverse supporting members on said guide rollers for vertical movement therewith relative to said rails;

gear means rotatably attached to said transverse support members and engaging said toothed rack for driving said members, said rollers and said means for mounting along said rails, and drive means for rotating said gear means.

8. An apparatus according to claim 7 and further including a brake engageable with said gear means to selectively prevent rotation thereof.

9. An apparatus according to claim 1 wherein said vehicle includes means on said vehicle frame for exerting force on said tiltable support means in a plane perpendicular to said horizontal tilting axis and having at least one component acting in the direction of travel of the vehicle.

10. An apparatus according to claim 1 wherein said side wall is substantially cylindrical and further includes first and second generally annular rails surrounding said side wall adjacent opposite ends thereof whereby said tank is rollable on said rails with the axis substantially horizontal.

11. An apparatus according to claim 10 wherein at least one of said top and bottom walls includes centrally located bearing pin means for pulling said tank, said apparatus further comprising a draft member attachable to said bearing pin.

12. An apparatus according to claim 10 and further comprising a bearing pin, means attachable to an end of said side wall for supporting said bearing pin, and draft means attachable to said bearing pin for rolling said tank.

* * * * *